(No Model.)

G. F. DAVIDSON.
INSECT TRAP.

No. 593,518. Patented Nov. 9, 1897.

Witnesses:
H. R. L. White.
R. A. White.

Inventor.
George F. Davidson
by Hartman & McAndrus Attys.

THE NORRIS PETERS CO., PHOTO-LITHO., WASHINGTON, D. C.

UNITED STATES PATENT OFFICE.

GEORGE F. DAVIDSON, OF CHICAGO, ILLINOIS.

INSECT-TRAP.

SPECIFICATION forming part of Letters Patent No. 593,518, dated November 9, 1897.

Application filed December 23, 1896. Serial No. 616,804. (No model.)

*To all whom it may concern:*

Be it known that I, GEORGE F. DAVIDSON, a citizen of the United States, residing at Chicago, in the county of Cook and State of Illinois, have invented certain new and useful Improvements in Insect-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to improvements in insect-traps for catching insects, preferably for roaches, water-bugs, and the like; and the invention consists in the construction and novel combination of parts hereinafter described, pointed out in the appended claims, and illustrated in the accompanying drawings, in which—

Figure 1:
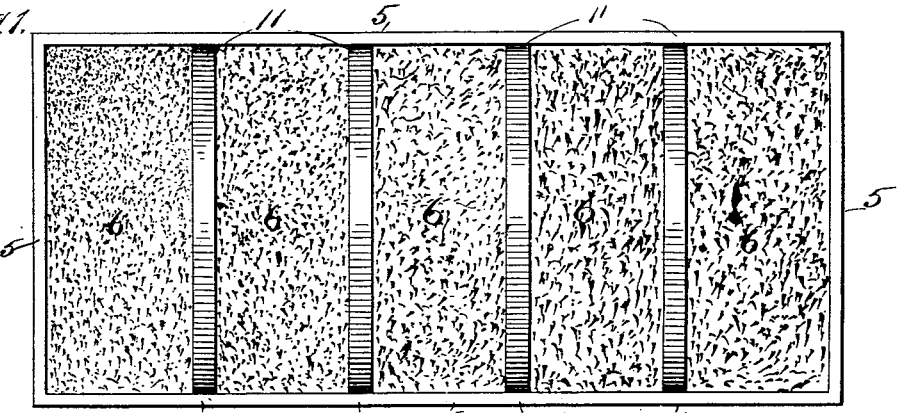
Figure 2:
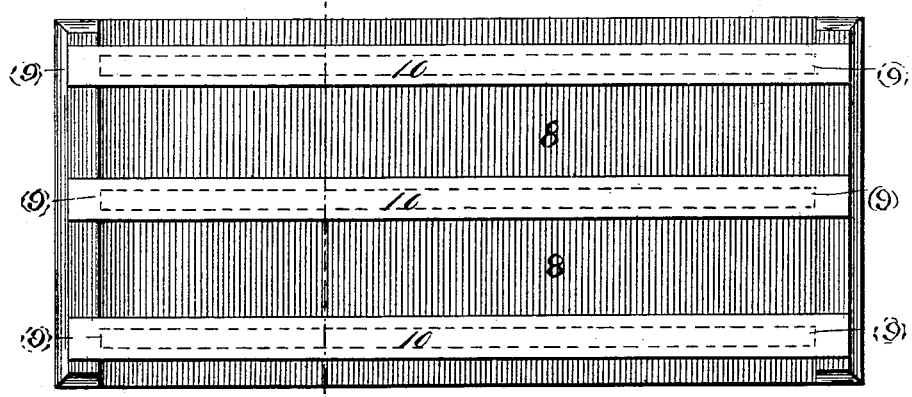
Figure 3:
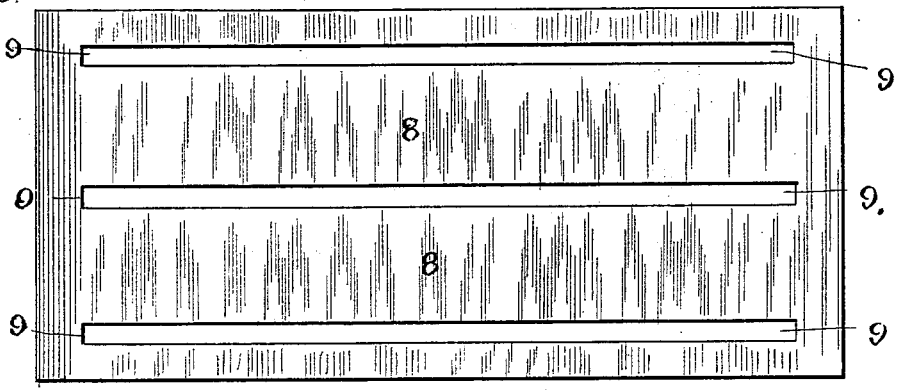
Figure 4:
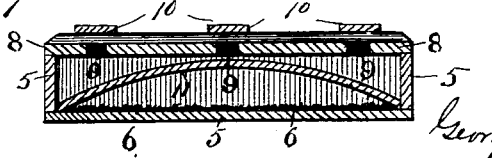

Figure 1 represents a top view of the box with its lid removed. Fig. 2 is a top view of the lid. Fig. 3 is a top view of the lid with the crevice-strips removed, and Fig. 4 is a cross-section of the device.

Similar numerals of reference refer to similar parts throughout the several views.
The box 5 is made of any suitable material, and its bottom is covered with adhesive substance 6 similar to that used for sticky fly-paper in common use. The adhesive covering may be applied directly upon the bottom of the box, but it is preferably used upon a sheet of suitable material cut to fit the bottom of the box, and is removably placed therein. Such sheet provides a removable covering, so it may be replaced with fresh sheets when needed. The lid 8 for the box 5 is provided with narrow slots 9 for the entrance of the insect. These slots 9 are so narrow that they resemble the crevices in which such insects usually escape and find refuge, such as are formed by shrinking of the woodwork in base-boards and around sinks, &c. They are preferably made just about large enough for the insect to pass through. Above these slots 9 and near to them are placed crevice-strips 10, which cover the slots 9 so they are not seen, and form crevice-passages to them on either side. This construction greatly aids in deceiving the insect, because they enter from a horizontal floor similar to the entrances the insect finds in base-boards and around sinks. Inside of the box 5 I place decoy-bridges 11 transversely to the slots. These bridges may be placed parallel to the bottom of the box 5; but I prefer to arch them and have their ends rest on the bottom of the box, as shown in Fig. 4. The purpose of this construction is that when the insect passes through the slots 9 into the box 5 it finds a safe landing on the bridge 11 and will follow it on down toward the adhesive substance 6, and will prefer this path to wandering upon the under side of the lid 8. The insect thus moves nearer to the adhesive substance, and any flapping of its wings or moving of its tentacles will bring them in contact with the adhesive substance more readily and thereby capture the insect. Another advantage of the arched form is that smaller insects can follow down the bridge 11 until they are very near the adhesive substance 6, and are therefore more easily entrapped.

The trap as described is my preferable construction for a complete trap; but the box provided with adhesive substance and made shallow and provided with a lid with the narrow slots described would form a good trap. If to this was added the crevice-strips 10, placed over the slots 9 to give a secret entrance, as described, it would aid the efficiency of the trap greatly; and if then we should add also the bridges placed transversely and parallel to the bottom we would add more largely to the efficiency of the trap. These constructions may, therefore, be used separately; but the preferable trap is the complete one described.

The operation is obvious from the description. The trap is baited with a piece of meat or other suitable bait, and is placed where the insects do most abound and left, say, over night. In the morning it is opened and it will be found that a large number of insects have been caught by the adhesive substance.

Having thus described my invention, what I claim as new, and desire to secure by Letters Patent, is—

1. In an insect-trap, a box having its bottom covered with adhesive substance on the inside, and a lid for the box provided with one or more slots adapted to form crevice-openings.

2. In an insect-trap, a box having its bottom covered with adhesive substance; a lid for the box provided with one or more narrow slots; and strips over and near the slots adapted to form a crevice-entrance thereto.

3. In an insect-trap, a box having its bottom covered with adhesive substance; a lid for the box provided with one or more narrow slots; strips placed over and near the slots adapted to form a crevice-entrance thereto; and decoy-bridges placed within the box transversely to the slots.

In testimony whereof I affix my signature in presence of two witnesses.

GEORGE F. DAVIDSON.

Witnesses:
T. B. MEINCKE,
H. R. L. WHITE.